March 2, 1943.  H. J. REITER  2,312,442
SNAP FASTENER
Filed July 5, 1941
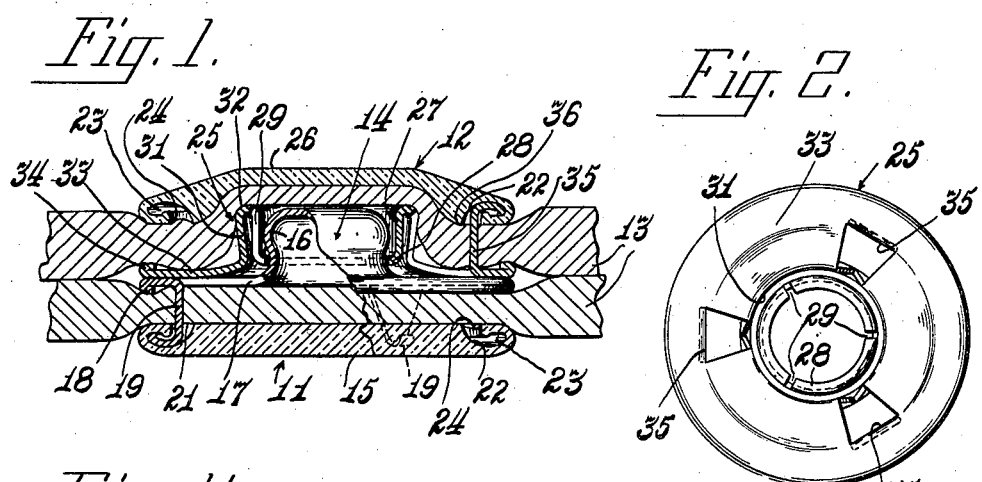
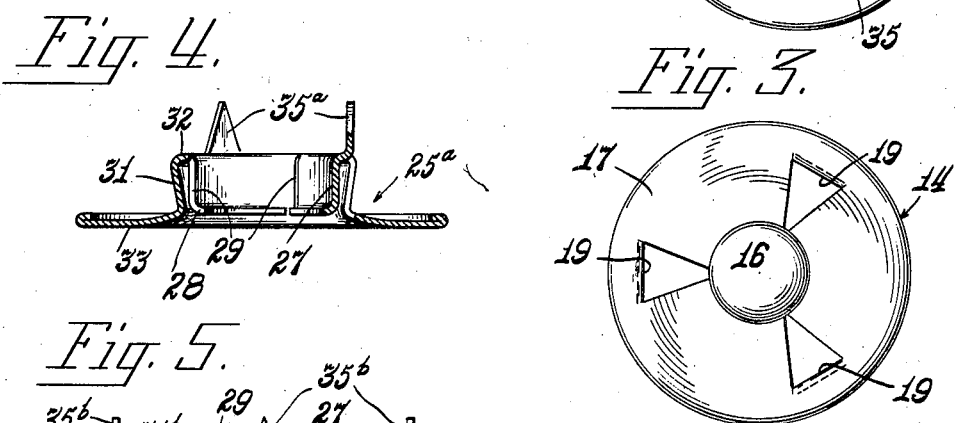
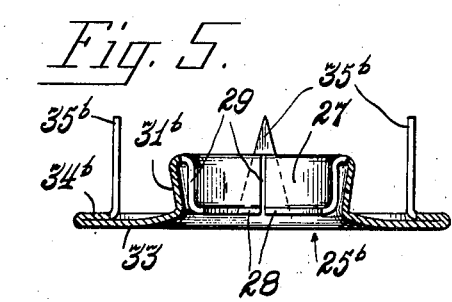
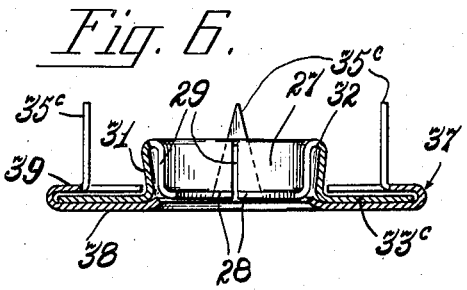
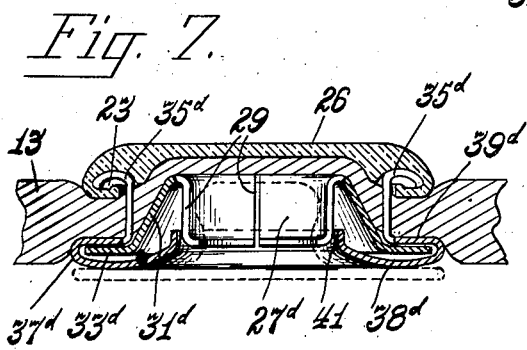
INVENTOR
HAROLD J. REITER
Elmer L. Zwickel
ATTORNEY Patented Mar. 2, 1943

2,312,442

UNITED STATES PATENT OFFICE 2,312,442

SNAP FASTENER

Harold J. Reiter, Chicago, Ill.

Application July 5, 1941, Serial No. 401,145

8 Claims. (Cl. 24—216)

The invention relates to improvements in separable snap fastener installations and more particularly to structurally improved resilient socket elements.

The present invention is concerned with snap fastener socket elements having a reinforced stud receiving socket and associated piercing tangs for cooperative engagement and clinching in suitable attaching elements. The instant structures constitute an improvement in the types of snap fastener elements illustrated and claimed in my Patent No. 2,235,168, issued March 18, 1941, and also in my co-pending application Serial No. 383,685, filed March 17, 1941.

The instant improvements embrace a structure wherein resilient stud engaging fingers of an expansible socket element are adequately reinforced against unwarranted flexing outwardly and permanent distortion and include piercing tangs integral with or attached thereto for securing the element to the material with which they are related.

It is, therefore, an object of the invention to provide a novelly constructed snap fastener element having a reinforced resilient stud receiving socket and struck-out piercing tangs.

Another object is to provide novelly constructed female snap fastener elements having tangs struck from the body thereof and disposed to pierce a sheet of material on which the elements are mounted; the tangs being positioned so as to be entirely concealed when the elements are installed.

Another object is to provide a snap fastener installation of a type wherein complemental portions of the material to which the fastener elements are attached are spaced but a minimum distance apart when the elements are inter-engaged.

Another object is to provide a female snap fastener element having a semi-floating reinforced resilient stud receiving socket and attached piercing tangs.

Another object is to provide a strong, efficient and inexpensively constructed snap fastener installation embodying novel structural features facilitating ready and secure attachment.

The foregoing and such other objects of the invention as will become more readily apparent as the description proceeds, will be more readily understood from a perusal of the following description; in which reference is had to the accompanying drawing, wherein:

Fig. 1 is an enlarged longitudinal sectional view of one embodiment of the snap fastener installation.

Fig. 2 is a plane view of the outside or exposed face of the socket element illustrated in Fig. 1.

Fig. 3 is a plane view of the stud element shown in Fig. 1.

Fig. 4 is an enlarged longitudinal sectional view of a modified form of socket element.

Fig. 5 is an enlarged longitudinal sectional view through another form of socket element.

Fig. 6 is an enlarged longitudinal sectional view through a socket element having an attached socket guard provided with integral piercing tangs.

Fig. 7 is a view similar to Fig. 1, showing a modified form of a socket of the type illustrated in Fig. 6.

Referring particularly to the snap fastener installation illustrated in Figs. 1 to 3, inclusive, the fastener includes male and female members 11 and 12. Said members are secured, respectively, to separate complemental portions of fabric, leather or other sheet material 13 and are arranged to detachably interlock to hold said portions together.

As best shown in Figs. 1 and 3, the male member 11 consists of a circular stud element 14 and attaching element 15. The stud element 14 is formed integral preferably from a thin circular sheet of metal. A substantially cylindrical wall defines a centrally located tubular body or stud portion 16 which is formed by striking or drawing the metal of the sheet upwardly. The stud portion 16 preferably is closed at its top and its cylindrical wall bows outwardly and then tapers inwardly downwardly, to provide a restricted throat, and finally outwardly to merge with a circular flange portion 17.

The flange 17 preferably lies in a substantially horizontal plane and its outer circumferential margin preferably is turned downwardly and then inwardly to provide a reinforced edge 18. Obviously, the circumferential edge of the flange may be left raw, in which instance a thinner stud element is provided. A plurality of pointed piercing tangs 19 preferably are struck out of the body of the flange 17 surrounding the stud 16. These tangs, preferably three in number, extend downwardly substantially at right angles to the plane of the flange 17, as shown.

To mount the male member, the stud element 14 is placed over one face of the sheet of material 13 with its body or stud 16 disposed away from said material. The piercing tangs 19 are then forced through the material until the reinforced edge 18 of the flange 17 rests against the face thereof. The attaching element 15, which is shown as a molded plastic cap for the purpose of this illustration, is arranged in axial alignment with the stud element 14 against the other face of the material 13 prior to the piercing operation. As shown in Fig. 1, one face of the attaching element 15 is annularly grooved and undercut as at 21. The inside wall 22 of the groove is gradually curved outwardly and downwardly to present an anvil surface which is contacted by the free ends of the tangs 19 when the latter are initially pressed downwardly thereagainst. Continued pressure causes the tangs to curl or roll outwardly radially along said anvil surface 22 and clinch in the undercut or circumferential channel 23.

Although the mounting operation may be accomplished by hand, it preferably is effected by the use of a suitable power press to insure sufficient curling of the tangs within the channel 23. This prevents separation of the male and attaching element and clamps the sheet of material securely therebetween. When the member is attached, the tangs are wholly concealed from view due to their being spaced inwardly from the circumferential edge of the stud element 14.

It is apparent that the tangs 19 cannot first be driven through the material and then carefully fitted into the annular channel of the attaching element 15. Accordingly, the annular entrance slot 24, defined by the walls of the groove 21, is considerably wider than the thickness of the metal forming the tangs. Consequently, whether the circle defined by the pointed ends of the circumferentially spaced tangs 19 is under or over size, said tangs will always pass freely through the annular slot and engage the anvil surface 22. It should be observed that the curvature of the said surface is substantially uniform throughout its width so as to cause the ends of the tangs always to contact an outwardly sloping surface and buckling of the tangs is avoided. It should be apparent at this time that the cross-section of the annular groove 21 can be reversed so as to cause the tangs to curl inwardly instead of outwardly as disclosed.

The female member 12 best illustrated in Figs. 1 and 2, preferably consists of a circular socket element 25 and an attaching element or cap 26. The socket element 25 also preferably is formed from a thin circular sheet of metal having an inner cylindrical wall 27 formed, on its lower face end, with an internal flange or lip 28 to provide a restricted opening to receive the stud 16 of the associated male member when the parts are matingly engaged. The inner cylindrical wall 27 and the internal lip 28 are suitably slit longitudinally, as at 29, at one or more points (three being shown) to define a plurality of resilient fingers adapted to yield outwardly when the stud is admitted or withdrawn therefrom. A second or outer cylindrical wall 31 surrounds and is substantially co-extensive with the inner wall 27 and is joined thereto by a fold 32 at the upper ends of said walls. The lower end of the outer cylindrical wall 31 terminates substantially in the plane of the lower end of the inner socket wall at which terminus it flares outwardly slightly downwardly to merge with a substantially flat margin to define a circular flange 33. If desired, the outer circumferential edge of the flange 33 may be folded over upwardly and then inwardly to provide a reinforcing bead 34, similar to the bead 18 on the stud flange 17. It will be noted that the circular flange 33 lies in a plane substantially below the plane of the lower end of the socket.

A plurality of piercing tangs 35, circumferentially spaced about the stud receiving socket, preferably are struck out of the body of flange 33 and outer cylindrical wall 31, as shown. Although any required number of piercing tangs may be provided, it is preferably in this instance, that only three such tangs be struck to avoid probable weakening of the socket element. The tangs 35 preferably are bent upwardly substantially at right angles to the plane of the flange 33, inwardly of the outer circumferential edge thereof.

To mount the female member, the socket element 25 is located over one face of the material 13 with its tangs 35 in contact therewith. When pressure is applied the tangs are forced through the material and the pointed ends curl outwardly radially into an inwardly opening circumferential channel 23 provided in the attaching element 26. The element 26 differs from the attaching element 15 in that it has an annular ridge 36 on its inside face spaced inwardly from the circumferential channel 23. The annular ridge 36 and the free inner edge of the outer channel wall constitute the inner and outer edges of an annular entrance slot 24 through which the tangs 35 pass when the elements are assembled. During the assembly operation, the outwardly and upwardly inclined anvil surface 22, formed by the outer face of the annular ridge 36, is initially contacted by the pointed ends of the tangs, consequently said tangs always curl outwardly radially into the channel 23.

The attaching elements or caps 15 and 26, although illustrated and described as formed of a molded plastic, obviously may be made of any suitable material such as for example wood, bone or solid or sheet metal, and the like. It should be noted also that the attaching element 26 is shaped on its bottom face to conform substantially to the contour of the socket member thus minimizing overall thickness in the installation.

The improved fastener installation is not readily damaged and the parts are not liable to tear or pull through the material to which they are attached. The resilient socket construction, wherein the resilient fingers are surrounded by the outer cylindrical wall, is such that the fingers are not permanently distorted or otherwise damaged should the assembly be subjected to lateral pulling, which in the absence of said cylindrical outer wall, would tend to bend one or more of the resilient fingers out of cylindrical alignment. Further, the resilient fingers are adequately protected against damage during the insertion of the stud by the inclined circular portion of the flange 33 immediately surrounding the socket which circular portion serves as a guide to protect the resilient fingers and direct the stud into the recessed circular socket opening.

The instant structure also protects the expansible socket wall from being damaged should the material carrying the female member be dropped or stepped upon, as well as while the material is being laundered.

The socket element 25a illustrated in Fig. 4, is like that illustrated in Fig. 1 in all respects except that in this embodiment the piercing tangs 35a, which also are struck out of the outer cylindrical wall 31 and flange 33, are bent upwardly at the fold 32 joining the inner and outer cylindrical walls. The structure provided is readily adapted to co-act with an attaching element substantially smaller in its overall diameter than the attaching cap 26 illustrated in Fig. 1. Also, the position of the tangs is such that they may be relatively short, thus minimizing the amount of material struck out of the body of the element and thereby providing a stronger item.

Fig. 5 illustrates a socket element 25b wherein the resilient fingers formed by the slotted inner cylindrical wall 27 are reinforced against excessive outward flexing by a surrounding wall 31b in the same manner as the socket elements previously described. This socket differs, however, from those earlier mentioned in that the outer circumferential marginal portion of the circular flange 33 is folded upwardly and then inwardly to lie against the top face of said flange. The reinforcing ring 34b thus provided has a plurality of circumferentially spaced piercing tangs 35b integral with its inner circumferential edge.

The socket element shown in Fig. 6 preferably is made of two pieces. It includes an inner circular piece of sheet material formed to provide an inner cylindrical wall 27 having an internal flange or lip 28 on its lower end and one or more longitudinal slits 29 therein to provide a plurality of resilient stud engaging fingers. An outer cylindrical reinforcing wall 31 is joined to the inner cylindrical wall at their upper ends by a fold 32. The wall 31 terminates substantially in the plane of the lower end of the resilient fingers at which terminus it merges into an external substantially flat circular flange 33c. An internally channelled ring 37, fitted over the circular flange 33c, has one wall 38 underlying the bottom face of said flange and terminating with its inner circumferential margin rolled upwardly slightly so as to be disposed in close proximity to the lower internally flanged end of the inner cylindrical wall 27. The other wall 39 of said ring overlies the top face of the circular flange 33c and has its inner circumferential edge disposed substantially in contact with the outer face of the outer cylindrical wall 31. A plurality of piercing tangs 35c are struck upwardly from and substantially at right angles to the channel wall 39 thereby providing, similarly to previously described structures, attached means for securely installing the socket element on a piece of material.

It should be noted at this time that the circular flange 33c is substantially less in material thickness than the spacing between the upper and lower walls 39 and 38 of the channelled ring 37 and that said ring has an internal diameter slightly larger than the diameter of the outer circumference of the circular flange 33c. This structure allows the inner socket portion to shift slightly relative to the channelled ring 37 after the unit has been secured to the material so as to afford means whereby said resilient socket may readily align itself with a mating stud element. The upwardly turned inner margin of the channel bottom wall 38 protects the lower socket end from damage which might ordinarily result from any excessive pressure being applied to the face of the socket element and also guides the stud element into the socket during assembly.

The two-piece socket disclosed in the installation shown in Fig. 7, includes a resilient or expansible stud receiving socket formed by an internally flanged slit cylindrical wall 27d which has its upper end terminate in a downwardly and outwardly flared substantially conical breast portion 31d. The breast portion 31d preferably terminates at or slightly below the plane of the flanged lower socket end and merges with a substantially flat circular flange 33d. An internally channelled ring 37d embraces loosely the flange 33d and its upper wall 39d is provided on its inside circumferential edge with integral piercing tangs 35d which extend upwardly substantially at right angles thereto. The lower wall 38d of the ring 37d preferably is curved downwardly from the outer edge thereof and then upwardly and terminates in an upwardly turned cylindrical wall 41 having an inside diameter slightly larger than the outside diameter of the resilient socket 27d.

The instant structure provides a unit wherein the inner or socket part may readily shift slightly relative to the attaching ring so as to facilitate its alignment with a mating stud element; and also affords means to protect the resilient socket fingers against damage either from an outside pressure upon the face of said socket or during insertion of a stud therein. The cylindrical surrounding wall 41 adequately prevents unlimited outward flexing and permanent distortion of the fingers should the attached fastener elements, when matted, be subjected to lateral strain.

Obviously, the instant improvements provide snap fastener installations wherein each fastener element is substantially embedded in the material and is adequately reinforced to prevent distortion of any essential portion thereof. The relative thinness of the flat marginal edges of the fastener elements and particularly those illustrated in Figs. 1 to 5, inclusive, tends to bring the complemental pieces of material closely together as distinguished from certain known types of fasteners having a large rolled edge to receive tangs carried by the attaching member.

Although exemplary forms of construction have been illustrated and described, it is to be understood that the disclosure is illustrative rather than restrictive and that the invention is not to be limited thereby but is to embrace such variations as will fall within the spirit of the invention and the scope of the appended claims.

I claim:

1. A snap fastener element comprising, in combination, a stud receiving resilient socket, a flange integral with the upper end of said socket extending downwardly in close spaced relation annularly to the adjacent surface of the socket and terminating in a circular marginal portion disposed in a plane below the lower end of the socket, and a plurality of circumferencially spaced piercing tangs struck out of said flange inwardly of its free circumferential edge and disposed substantially at right angles to the plane of said marginal portion.

2. A snap fastener socket element comprising, in combination, an inner cylindrical wall, an internal lip on the lower end of said wall, said lip and wall having slits therein to provide resilient stud engaging fingers, an outer cylindrical wall co-extensive with and closely spaced from and surrounding said fingers, said wall being integral at one end with the upper socket end and providing a backing for the fingers to prevent permanent distortion thereof when said fingers are flexed outwardly during use, an external circumferencial flange integral with the lower end of said outer wall disposed in a plane below the plane of the lower end of the inner wall, said external flange having its outer circumferencial edge folded upwardly and inwardly to define a reinforcing ring lying against the top surface of said flange, and a plurality of piercing tangs integral with the free inner edge of said ring and extending upwardly substantially at right angles thereto.

3. A one-piece snap fastener socket element comprising, in combination, an inner cylindrical wall, an internal flange on the lower end of said wall, said internal flange and wall having a plurality of slits therein to provide resilient stud engaging fingers, an outer cylindrical wall joined at its upper end with the upper end of said inner wall and terminating, at a plane below the lower end of said inner wall, in an external circular flange, said outer wall having an inside diameter slightly larger than the outside diameter of the inner wall so as to limit outward flexing of the resilient fingers, and a plurality of piercing tangs integral with said element, said tangs being circumferentially spaced inwardly of the free circumferencial edge of the flange.

4. A snap fastener socket element comprising, in combination, an inner cylindrical wall, an internal flange on the lower end of said wall, said internal flange and wall having a plurality of slits therein to provide resilient stud engaging fingers, an outer cylindrical wall joined at its upper end with the upper end of said inner wall and terminating, at a plane below the lower end of said inner wall, in an external circular flange, a circumferencial reinforcing ring integral with and lying tightly against the circumferencing margin of said flange, said outer wall having an inside diameter slightly larger than the outside diameter of the inner wall so as to limit outward flexing of the resilient fingers, and a plurality of piercing tangs on said element inwardly of the reinforcing ring.

5. A snap fastener socket element comprising, in combination, an inner cylindrical wall, said wall having slits therein to provide resilient stud engaging fingers, an outer cylindrical wall coextensive with and closely spaced from and surrounding said fingers, said wall being integral at one end with the upper socket end and providing a backing for the fingers to prevent permanent distortion thereof when said fingers are flexed outwardly during use, an external circumferencial flange integral with the lower end of said outer wall disposed in a plane below the plane of the lower end of the inner wall, said external flange having its outer circumferencial edge folded over against a surface of said flange, and a plurality of piercing tangs integral with and spaced inwardly of the circumferencial edge of said flange.

6. A one-piece snap fastener socket element comprising, in combination, an inner cylindrical wall, said inner wall having a plurality of slits therein to provide resilient stud engaging fingers, an outer cylindrical wall joined at its upper end with the upper end of said inner wall and terminating, at a plane below the lower end of said inner wall, in an external circular flange, said outer wall having an inside diameter slightly larger than the outside diameter of the inner wall so as to limit outward flexing of the resilient fingers, and a plurality of piercing tangs integral with said element, said tangs being circumferencially spaced inwardly of the free circumferencial edge of the flange.

7. A snap fastener socket element comprising, in combination, an inner cylindrical wall, said inner wall having a plurality of slits therein to provide resilient stud engaging fingers, an outer cylindrical wall joined at its upper end with the upper end of said inner wall and terminating, substantially in the plane of the lower end of said inner wall, in an external circular flange, a circumferencial reinforcing ring integral with and lying tightly against the circumferencial margin of said flange, said outer wall having an inside diameter slightly larger than the outside diameter of the inner wall so as to limit outward flexing of the resilient fingers, and a plurality of piercing tangs on said element inwardly of the reinforcing ring.

8. A snap fastener element comprising, in combination, a stud receiving socket, a flange integral with the upper end of said socket extending downwardly and terminating in a circular marginal portion disposed substantially in the plane of the lower end of the socket, and a plurality of circumferentially spaced piercing tangs struck out of said flange inwardly of its free circumferencial edge and disposed substantially at right angles to the plane of said marginal portion.

HAROLD J. REITER.